(12) United States Patent
Potter et al.

(10) Patent No.: US 7,373,356 B2
(45) Date of Patent: May 13, 2008

(54) TRANSDUCER SPECIFICATION DATABASE

(75) Inventors: David L. Potter, Austin, TX (US); Mohammed Kamran Shah, Austin, TX (US)

(73) Assignee: National Instruments Corporation, Austin, TX (US)

( * ) Notice: Subject to any disclaimer, the term of this patent is extended or adjusted under 35 U.S.C. 154(b) by 986 days.

(21) Appl. No.: 10/219,054

(22) Filed: Aug. 14, 2002

(65) Prior Publication Data

US 2004/0034658 A1 Feb. 19, 2004

(51) Int. Cl.
*G06F 17/30* (2006.01)

(52) U.S. Cl. ............................. 707/102; 707/3; 707/10; 702/104

(58) Field of Classification Search ............ 705/26–27; 707/1–3, 10, 100–102
See application file for complete search history.

(56) References Cited

U.S. PATENT DOCUMENTS

| | | | |
|---|---|---|---|
| 6,553,336 B1* | 4/2003 | Johnson et al. | 702/188 |
| 6,801,878 B1* | 10/2004 | Hintz et al. | 702/188 |
| 6,922,632 B2* | 7/2005 | Foxlin | 701/207 |
| 6,980,962 B1* | 12/2005 | Arganbright et al. | 705/26 |
| 2002/0147936 A1* | 10/2002 | Wiczer | 714/4 |
| 2002/0193571 A1* | 12/2002 | Carter et al. | 530/387.3 |

OTHER PUBLICATIONS

Steven Chan, "Update on the IEEE 1451 Smart Transducer Interface Standard," AEPTEC Microsystems / 3E Technologies, 6 pages.
"Introduction to IEEE P1451.3," Rev. A, May 30, 2000, 7 pages.
"National Instruments CEO Addresses Gathering of World's Manufacturers," Mar. 19, 2002, 3 pages.
Licht and Baekee, "Implemetation of Extended Functionality of IEEE P1451.4 Transducers," Version 1.0, Nov. 11, 1998, 3 pages.
Robert N. Johnson, "Building Plug-and-Play Networked Smart Transducers," Sensors Magazine, Oct. 1997, 17 pages.
David Potter, "IEEE Standard On the Way for Smart, Plug and Play Sensors," National Instruments, 4 pages.
"Draft Standard for a Smart Transducer Interface for Sensors and Actuators," Publication No. IEEE P1451.3/D1.10, Dec. 20, 2001, 10 pages.
"Product finder for manfactures' own websites"; News Release; Dec. 7, 2001; 3 pages; retrieved from www.engineeringtalk.com/news/glo/glo103.html.
"GlobalSpec Announces Partnership with eFunda"; Press Release; Jan. 18, 2001; 2 pages; retrieved from www.efunda.com/about/pr_010118.cfm.

* cited by examiner

*Primary Examiner*—Debbie Le
(74) *Attorney, Agent, or Firm*—Meyertons Hood Kivlin Kowert & Goetzel, P.C.; Jeffrey C. Hood; Martin R. Wojcik

(57) ABSTRACT

A computer-implemented method for operating a transducer database includes creating an electronic datasheet for a type of sensor on a computer, and registering the electronic datasheet for the type of sensor in a transducer database. Creating an electronic datasheet may include specifying attribute values for the type of sensor in the transducer database via a network connection. Registering may include storing the first electronic datasheet in the database. A sensor may be coupled to a system that obtains the electronic datasheet over a network and configures a device or software program. The sensor may have only analog interface connections.

25 Claims, 15 Drawing Sheets

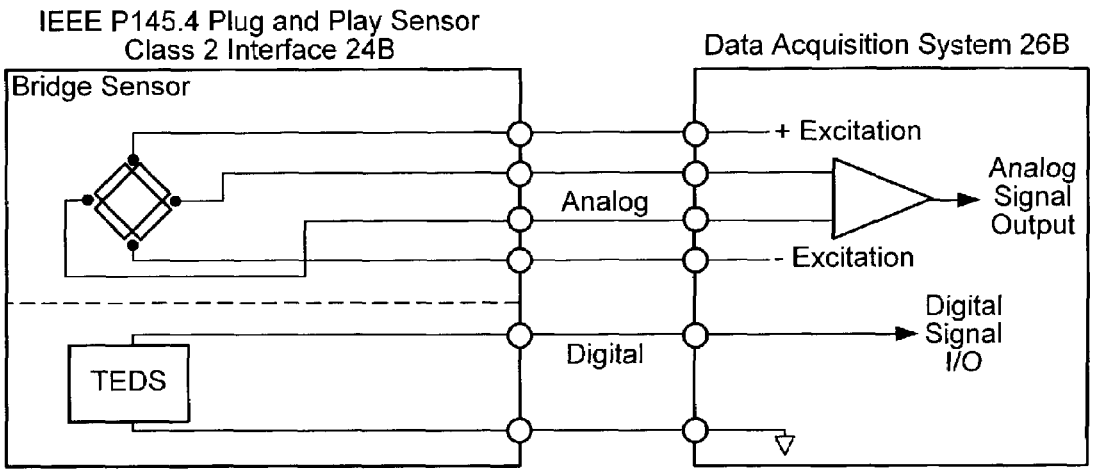

*Fig. 2B*
(Prior Art)

| | Manufacturer ID | 43 (Acme Accelerometer Company) |
|---|---|---|
| Basic TEDS | Model Number | 7115 |
| | Version Letter | B |
| | Serial Number | X001891 |
| Standard and Extended TEDS (fields will vary according to transducer type) | Calibration Date | Jan 29, 2000 |
| | Sensitivity @ ref. condition (S ref) | 1.0094E+03 mV/g |
| | Physical measurement range | ± 50 g |
| | Electrical output range | ± 5 V |
| | Reference frequency (f ref) | 100.0 Hz |
| | Quality factor @ fref (Q) | 300 E-3 |
| | Temperature coefficient | -0.48 %/°C |
| | Reference temperature (T ref) | 23 °C |
| | Sensitivity direction (x,y,z) | x |
| User Area | Sensor Location | Strut 3A |
| | Calibration due date | April 15, 2002 |

TRANSDUCER SPECIFICATION DATABASE

FIELD OF THE INVENTION

The present invention relates to the field of computer-based test systems, and more particularly to a system and method for using a transducer database.

DESCRIPTION OF RELATED ART

FIG. 1—Plug and Play Sensor with Embedded TEDS Data (Prior Art)

FIG. 1 illustrates an exemplary plug and play sensor 10 known in prior art. The sensor 10 contains a transducer 12 operable to take analog measurements, and an embedded transducer electronic data sheet (TEDS) 14, also referred to herein as an electronic datasheet. The IEEE P1451.4 working group is preparing a standard for defining how analog transducers, also referred to herein as sensors, can include self-describing capabilities for simplified plug and play operation. The standard defines a mixed-mode interface 16 that retains the traditional analog sensor signal 18, and adds a low-cost serial digital link 20 to access TEDS 14 embedded in the sensor 10 for self-identification and self-description.

To set up and configure a data acquisition system, important sensor parameters such as measurement range, sensitivity of the sensor, and measurement scale may need to be supplied in order for software to properly use and scale the sensor data. The TEDS 14 is designed to store and provide this type of information, thus a system outfitted with IEEE P1451.4 sensors and actuators can automate this configuration step, while also increasing the general integrity and reliability of the system. Since IEEE P1451.4 maintains the analog output of the sensor, IEEE P1451.4 transducers are compatible with legacy systems that include traditional analog interfaces.

FIGS. 2A and 2B—IEEE 1451.4 Interfaces (Prior Art)

FIGS. 2A and 2B illustrate the IEEE P1451.4 standard definition of two types of mixed-mode interfaces, designated as Class 1 two-wire and Class 2 multi-wire interfaces.

FIG. 2A illustrates the Class 1 two-wire interface, which can work with constant-current powered, or ICP, transducers, such as accelerometers. Class 1 transducers include diodes or analog switches that allow multiplexing of the analog signal with the digital signal on a single pair of wires.

FIG. 2B illustrates the Class 2 interface, which uses a separate connection for the analog and digital portions of the mixed-mode interface. The Class 2 interface can work for other types of sensors than ICP sensors. The analog input/output section of the transducer is left unmodified, and the digital TEDS circuit is added in parallel. This enables the implementation of plug and play transducers with virtually any type of sensor or actuator, including thermocouples, RTDs, thermistors, bridge sensors, electrolytic chemical cells, and 4-20 mA current loop sensors, among others. For example, FIG. 2B illustrates the implementation of a Class 2 mixed-mode interface with a bridge sensor.

The digital portion of the mixed-mode interface, for both Class 1 and Class 2, is based on a One-Wire protocol from Maxim/Dallas Semiconductor. The One-Wire protocol is a simple and low-cost, master-slave serial communication protocol. This single wire protocol requires that a single master device (e.g. the data acquisition system) supplies power and initiates each transaction with each node according to a defined transaction timing sequence.

FIG. 3—Example TEDS for an Accelerometer (Prior Art)

FIG. 3 is a table illustrating information contained in a transducer electronic data sheet (TEDS) 14 for sensor self-identification. IEEE P1451.4 defines a standard format for TEDS data to be embedded into plug and play transducers. At a minimum, each IEEE P1451.4 TEDS should contain data for the manufacturer, model number, and serial number of the corresponding transducer. Most TEDS's also describe important attributes of a sensor or an actuator, such as measurement range, sensitivity, temperature coefficients, and electrical interface. FIG. 3 shows one example of a TEDS 14 for an accelerometer.

With the advent of IEEE 1451, many instrumentation systems may soon include sensors having a TEDS. However, methods are needed for managing TEDS information for various sensors and for enabling users access the TEDS information for system development, searching, and purchase. In addition, methods are needed for providing self-describing capabilities for simplified plug and play operation for sensors which do not have a digital interface connection, such as legacy analog sensors.

SUMMARY OF THE INVENTION

One embodiment of the present invention includes a system and a method for operating a transducer database. The transducer database may be used to store transducer electronic datasheets for various types of sensors. The transducer database may be stored on a single server computer system, or may be stored on a plurality of computer systems.

Embodiments of the invention include a registration process for registering TEDS in the database and access methods for accessing and using this TEDS information. The transducer database described herein provides a greatly simplified mechanism for enabling users of a measurement system to access and use TEDS information for various different sensor types from various manufacturers. For example, the transducer database may be accessed and used to retrieve TEDS information for sensors in a system being developed, or to retrieve TEDS information for a sensor being purchased. The transducer database may be accessed and used to determine appropriate sensors based on user criteria. The transducer database may also operate as a central web site for purchasing sensors, or a central site used to provide TEDS information for sensors purchased on other manufacturer web sites. Also, the transducer database may be used to simulate plug and play operation for legacy sensors.

An exemplary embodiment of the method for operating the transducer database may include creating a first electronic datasheet (e.g., a TEDS) for a first type of sensor on a first computer. Creation of the first electronic datasheet may include specifying one or more attributes for the first type of sensor. In one embodiment, a datasheet for a sensor model may be created first, where the first electronic datasheet may be an instance of the datasheet for the sensor model. The datasheet for the sensor model may include a plurality of distinct first electronic datasheets, wherein each one of the plurality of distinct first electronic datasheets may correspond to a different type of sensor. In one embodiment, the transducer database may include one or more of following categories for categorizing electronic datasheets:

a type, such as a thermocouple;

a sub-type, such as a J-type thermocouple;

a model, such as an acme model thermocouple, and a specific instance, where a specific instance may include a serial number of the sensor, such as an SN 110A4 acme model thermocouple. Other embodiments may use additional or fewer categories for categorizing electronic datasheets.

After the first electronic datasheet has been created, the method may include accessing the transducer database over a network to register the first electronic datasheet. The network access may include client-server communication, email, ftp, and/or a web browser. The network access may be an encrypted access. The method may include sending the first electronic datasheet using fax, phone, or regular mail. The first electronic datasheet for the first type of sensor may then be registered in the transducer database. The registration may include storing the first electronic datasheet in the transducer database. The registration may also include storing information such as a name of the creator of the first electronic datasheet, an icon representing the sensor and/or the TEDS information, searchable information on the sensor type, pricing information, and possibly other information. The registration process may utilize security features, such as verifying a user name, a user password, and/or a digital certificate. The registration may also be encrypted. In this manner, various sensor developers may operate to register the electronic datasheet for various types of sensors. The storage of the electronic datasheet for sensors from various manufacturers may operate to provide sensor users the ability to use this information in a more powerful manner.

For a user developing a computer based measurement system, including sensors, the computer system may include software that is operable to access the transducer database to obtain TEDS information for sensors present in the system. The transducer database may be accessed over the network, and/or locally, where at least a part of the transducer database may be stored locally. The user may provide input on the sensors present in the system. The software may operate to automatically retrieve TEDS information from the sensors. Thus, the user can obtain the first electronic datasheet from the transducer database for the first sensor by accessing the transducer database over the network. The first electronic datasheet can be stored in part or entirely in the system, using computer memory and storage media such as a hard drive, RAM memory, and/or flash memory, among others.

In one embodiment, the first sensor may not have a digital interface connection, or in other words, the first sensor only has an analog interface connection. In this case, the first sensor does not contain the first electronic datasheet. In effect, by storing the TEDS information for the first sensor, the computer system may be simulating plug and play functionality for the first sensor. This way, legacy analog sensors can be used in plug and play sensor systems as if they had smart sensor functionality. Digital sensors can also be used.

A user developing a measurement system may use the transducer database to search for various sensors that meet his/her criteria. For example, the user may access the transducer database and provide input specifying desired attributes of a sensor. The desired attributes may include one or more of the following, among others:

type of measurement, such as temperature, voltage, current, strain, or acceleration, besides others, number of bits, manufacturer, range of each measurement, and sampling speed requirements for each measurement.

Software executing on the transducer database server, or on the computer system, may search the transducer database using the desired attributes. The software may thus determine one or more sensors that exhibit the desired attributes. For example, the determined sensors may exhibit the desired attributes, such as being able to take the desired type of measurement, have the desired measurement range and sampling speed, and/or being made by a specific manufacturer.

A user who desires to purchase a sensor may access a manufacturer's website in the manner described below, or alternatively the user may access a reseller's web site. The manufacturer's or the reseller's web site may utilize an e-commerce graphical user interface usable to purchase the one or more sensors. The user may use the e-commerce graphical user interface to indicate a desire to purchase a first sensor of the determined one or more sensors. In addition, the e-commerce graphical user interface can be used to receive payment information from the user in order to finalize the purchase.

In one embodiment, the method may further include displaying one or more icons corresponding to each of the determined one or more sensors. The method may further include selecting a first icon out of the one or more icons corresponding to each of the determined one or more sensors to elect to purchase a first sensor of the determined one or more sensors. The method may further include user dragging and dropping the one or more icons corresponding to each of the determined one or more sensors into a configuration diagram.

The user may then receive the first sensor from the first manufacturer or from the reseller. Upon receiving the first sensor, the user may couple the first sensor to the system. In addition the software program may automatically configure itself based on data in the first electronic datasheet (TEDS). For legacy sensors, the user may need to configure the software program using the first TEDS, which may be done using a graphical user interface.

In one embodiment, the method may further include the first sensor self-calibrating itself. The self-calibration may use the transducer database to obtain corresponding calibration constants and/or algorithms. The method may further include the transducer database reminding the user to calibrate the first sensor during at least one of a certain time interval or a pre-defined date. For example, the transducer database could remind the user to calibrate the first sensor every six months. In one embodiment, the method may further include searching the transducer database for calibration information corresponding to the first sensor to determine if the first sensor has a fault.

In one embodiment, the method may further include the transducer database automatically updating the first electronic datasheet corresponding to the first sensor. Updating may include accessing the transducer database over a network. The method may further include configuration of at least one of a device or a software program based on data in the first updated electronic datasheet. In one embodiment, configuration of at least one of a device or a software program may be performed after updating the first electronic datasheet corresponding to the first sensor.

BRIEF DESCRIPTION OF THE DRAWINGS

FIGS. 2A and 2B illustrate IEEE 1451.4 interfaces, according to Prior Art;

FIG. 3 illustrates an example TEDS for an accelerometer, according to Prior Art;

DETAILED DESCRIPTION OF THE PREFERRED EMBODIMENTS

Figure 4:
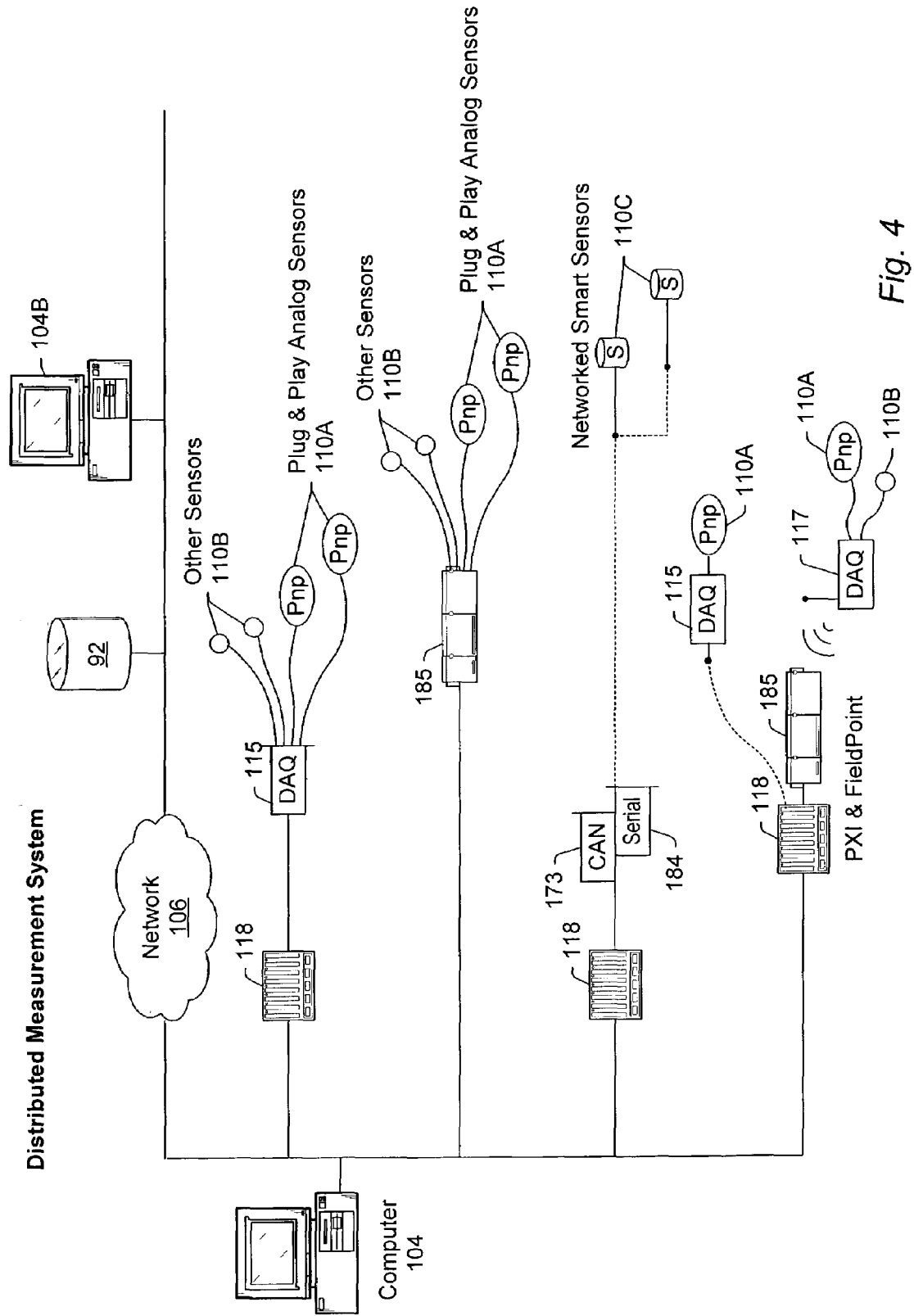
FIG. 4 illustrates an exemplary distributed measurement system, according to one embodiment.

FIG. 4—Distributed Measurement System

FIG. 4 shows an exemplary distributed measurement system. As shown, an exemplary measurement system may include a computer system 104 having a display. The computer system 104 may couple through one or more networks or buses to various measurement devices.

In this exemplary embodiment, the computer 104 may couple through the network 106 to a second computer 104B and to a storage system storing a database 92. The computer 104 may couple to a PCI or PXI (PCI/PXI) chassis 118 that includes one or more DAQ (data acquisition) cards 115, which in turn couple to one or more Plug & Play analog sensors 110A or other sensors 110B. The computer 104 may couple to a distributed I/O system (or a distributed data acquisition system) 185, such as the FieldPoint system available from National Instruments, which in turn couples to one or more Plug & Play analog sensors 110A or other sensors 110B. The computer 104 may couple to a PCI/PXI chassis 118 that includes one or more industrial network cards, such as a CAN interface card 173 and a serial interface card 184, which in turn may couple to one or more networked smart sensors 110C. The computer 104 may couple to a PXI system 118 and/or distributed I/O system 185, which in turn couples to one or more DAQ modules 115 connected in a wired manner, such as through a serial, parallel, or network bus. The DAQ modules 115 may couple to one or more Plug & Play analog sensors 110A, smart sensors 110C, or other sensors 110B. The PXI system 118 and/or distributed I/O system 185 may also couple to one or more wireless DAQ modules 117 connected in a wireless manner. The wireless DAQ module 117 may couple to one or more Plug & Play analog sensors 110A and/or other sensors 110B.

The main computer system 104 may be part of the system that executes programs during operation of the system. The computer system 104 may serve as the central console (or the main computer system) of the distributed measurement system. The computer system 104 may also be used to create, configure and/or deploy programs to any of the various devices in the distributed measurement system in some embodiments.

Figure 5A:
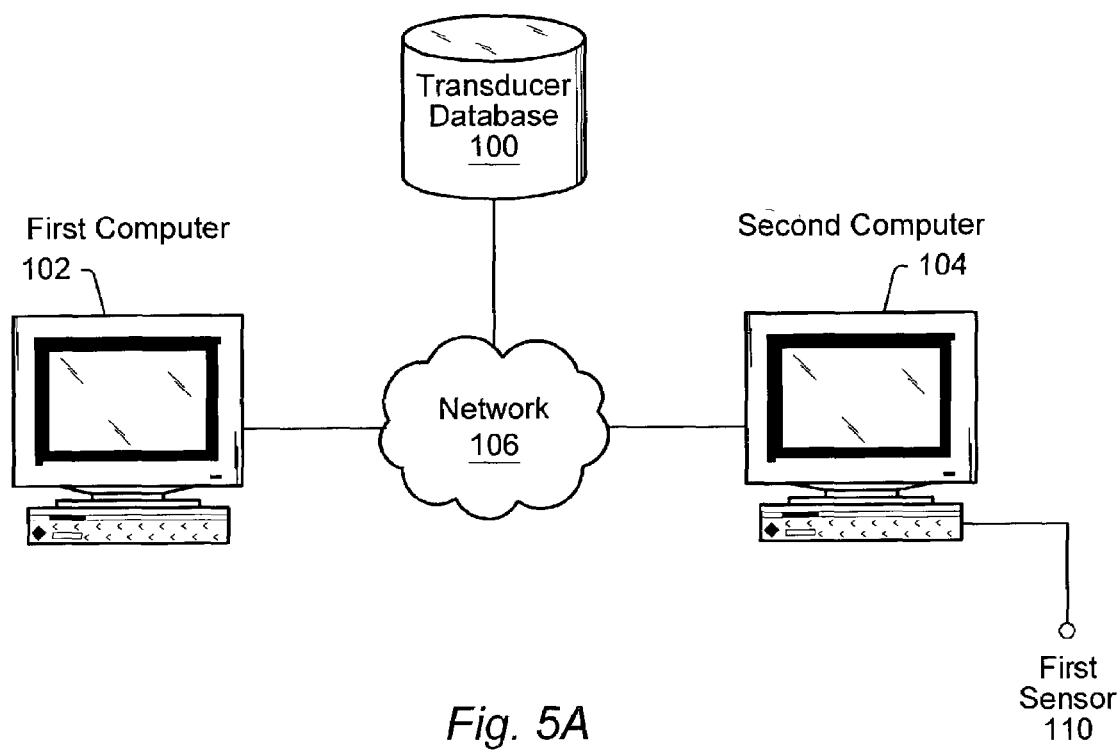
FIG. 5A illustrates an exemplary system for operating a transducer database, according to one embodiment.

FIG. 5A—An Exemplary System for Operating a Transducer Database

FIG. 5A illustrates an exemplary system for operating a transducer database, according to one embodiment.

In one embodiment, the system may include a transducer database 100 coupled to a network 106. The transducer database may include a database implemented in a computer system, or in a plurality of computer systems. For example, in one embodiment, the transducer database 100 may use a distributed database model. In another embodiment, the transducer database 100 may include a server computer system. The transducer database 100 stores a plurality of electronic transducer datasheets for a plurality of sensors from a plurality of different manufacturers. The network 106 may be of one or more of the following: WAN, Internet, Ethernet, wireless, and/or LAN, among others.

The system may include a first computer 102, wherein the first computer is coupled to the network 106. The first computer 102 may be a Windows computer, a Macintosh computer, or a UNIX computer, among others. The system may include a first type of sensor (not shown), also referred to herein as a transducer. The first type of sensor may be an analog sensor operable to measure analog phenomena, such as temperature, pressure, acceleration, flow, strain, voltage, current, and/or resistance, besides others.

Figure 1:
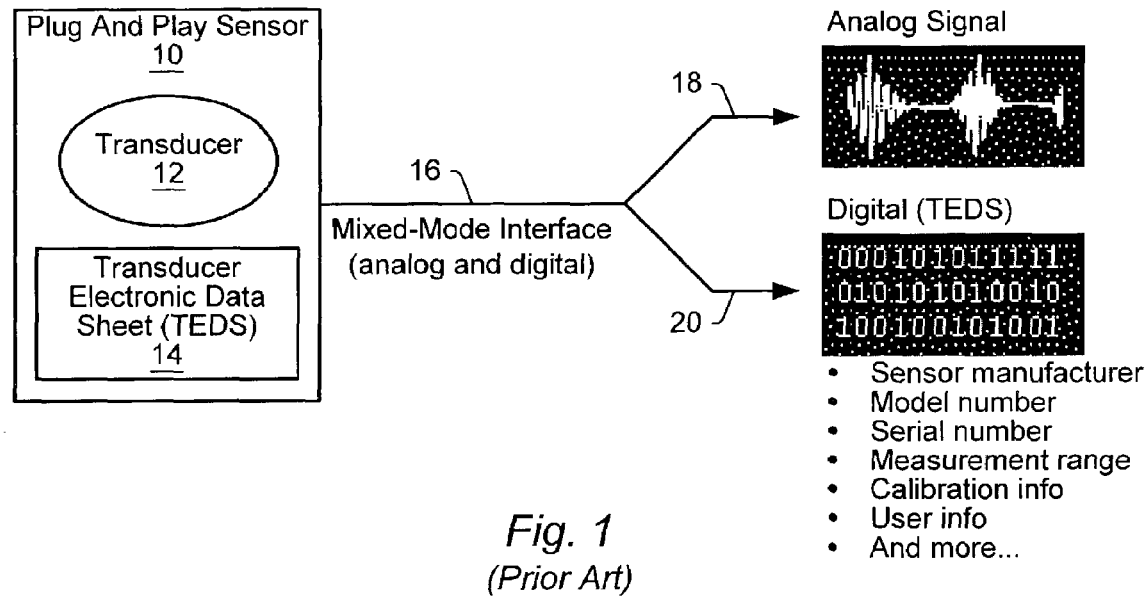
FIG. 1 illustrates a plug and play sensor with embedded TEDS data, according to Prior Art.
Figure 2A:
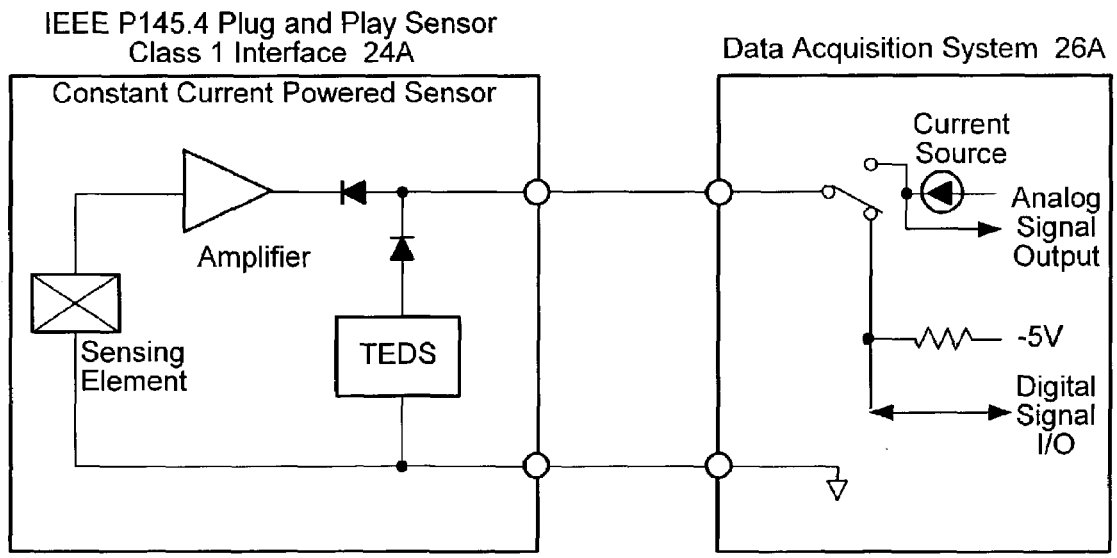

In one embodiment, the first computer 102 may be operable to create a first electronic datasheet, also referred to herein as a transducer electronic datasheet (TEDS), for the first type of sensor. The first computer 102 may be associated with a sensor manufacturer. Exemplary electronic datasheet information is described above with reference to FIGS. 1-3. The electronic datasheet may include any information that may be stored on a memory medium describing characteristics of a sensor. Example information in the electronic datasheet may include manufacturer ID, model number, serial number, calibration date and/or data, sensitivity, physical measurement range, temperature coefficient, and/or calibration due date, among others. The first computer 102 may be further operable to access the transducer database 100 over the network 106 and register the first electronic datasheet for the first type of sensor in the transducer database 100 by storing the first electronic datasheet in the transducer database 100. The network access may include client-server communication, email, ftp, and/or a web browser. The first electronic datasheet may also be transmitted using a fax, phone, or regular mail prior to registering.

In one embodiment, a first sensor 110 may be coupled to a second computer 104, also referred to herein as a system 104. The second computer 104 may be coupled to the network 106. In one embodiment, the first sensor 110 is of the first sensor type. The second computer 104 may obtain the first electronic datasheet from the transducer database 100 for the first sensor 110 by accessing the transducer database 100 over the network 106. The first electronic datasheet may correspond to sensors of the first sensor type. The network access may include client-server communication, email, ftp, and/or a web browser. The first electronic datasheet may also be transmitted using a fax, phone, or regular mail.

In one embodiment, the first sensor 110 may not have a digital interface connection, or in other words, the first sensor 110 only has an analog interface connection. The first sensor 110 may not contain the first electronic datasheet. In effect, by storing the TEDS information for an analog sensor, the computer system may be simulating plug and play functionality for the first sensor 110. This way, legacy analog sensors can be used in plug and play sensor systems as if they had smart sensor functionality. Digital sensors can also be used.

Figure 5B:
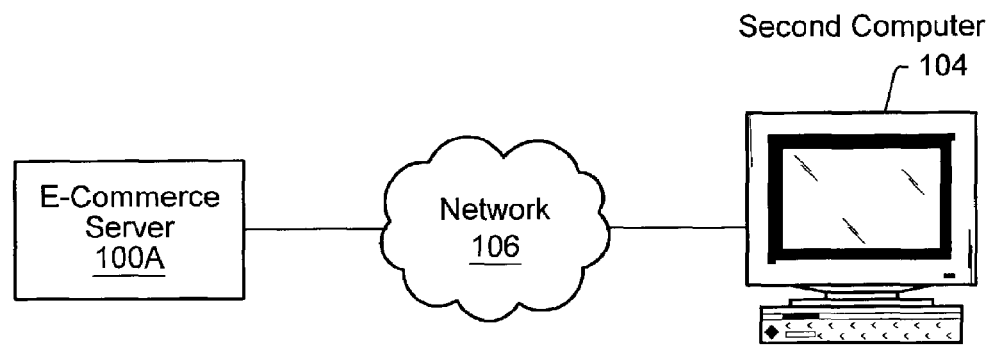
FIG. 5B illustrates an exemplary system for selecting a sensor for a measurement system, according to one embodiment.

FIG. 5B—Exemplary System for Selecting a Sensor for a Measurement System

FIG. 5B illustrates an exemplary system for selecting a sensor for a measurement system, according to one embodiment. The second computer 104 may be coupled to an E-commerce server 100A via the network 106. In one embodiment, the E-commerce server may be a part of the transducer database 100. In other words, the E-commerce server and the transducer database may be implemented in the same server, or may be implemented on different computer systems. In another embodiment, the transducer database 100 may be a part of the E-commerce server. In yet another embodiment, the E-commerce server and the transducer database may be two or more separate entities, operable to work together.

Figure 6A:
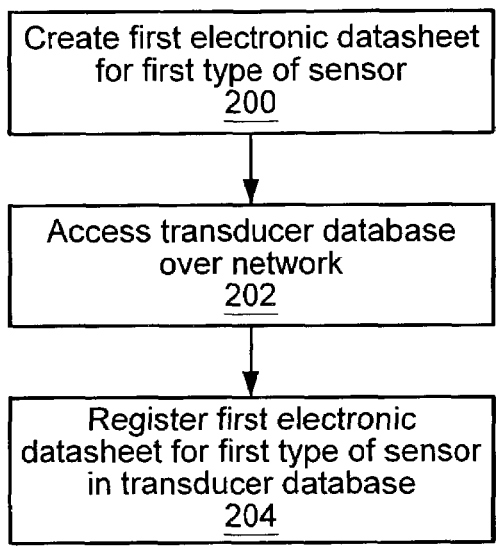
FIG. 6A is a flowchart of a method for operating a transducer database, according to one embodiment.

FIG. 6A—Flowchart for Operating a Transducer Database

FIG. 6A illustrates a flowchart for a computer-implemented method for operating a transducer database, according to one embodiment.

In step 200, the user may create a first electronic datasheet for a first type of sensor on a first computer 102, wherein creating may include specifying one or more attributes for the first type of sensor. In one embodiment, the user may create a datasheet for a sensor model, wherein the first electronic datasheet may be an instance of the datasheet for the sensor model. In one embodiment, the datasheet for the sensor model may include a plurality of distinct first electronic datasheets. Each one of the plurality of distinct first electronic datasheets may correspond to a different type of sensor, or in another embodiment, a different model of sensor, as enumerated below. For example, the datasheet for the sensor model may correspond to an ACME model thermocouple, and each distinct first electronic datasheet may correspond to a distinct sensor (specific instance), each with different calibration data, among other sensor attributes. In one embodiment, the transducer database 100 may include one or more of following categories for categorizing electronic datasheets:

a type, such as a thermocouple;
a sub-type, such as a J-type thermocouple;
a model, such as an ACME model thermocouple, and
a specific instance, where a specific instance may include a serial number of the sensor, such as an SN 110A4 ACME model thermocouple. Other embodiments may use additional or fewer categories for categorizing electronic datasheets.

In step 202, the first computer 102 may access the transducer database 100 over a network 106, such as described above with reference to FIG. 4A. In one embodiment, accessing may include using encrypted access over the network 106. In other words, the networked communication between the first computer 102 and the transducer database 100 may be performed using any type of confidential and/or secure data transfer that best suits the application. The network access may include client-server communication, email, ftp, and/or a web browser. The first electronic datasheet may also be transmitted using a fax, phone, or regular mail prior to registering.

In step 204, the first computer 102 may register the first electronic datasheet for the first type of sensor in the transducer database 100, where registration process may store the first electronic datasheet in the transducer database 100. In one embodiment, the registration process may also use security features, such as confirming one or more of a user name, a user password, a digital signature, and/or any other kind of secure and confidential user verification method for authorized access. The registration process may further use encrypted access over the network 106.

It is noted that the flowchart of FIG. 6A is exemplary only. Further, various steps in the flowchart of FIG. 6A may occur concurrently or in different order than that shown, or may not be performed, as desired. Also, various additional steps may be performed as desired.

Figure 6B:
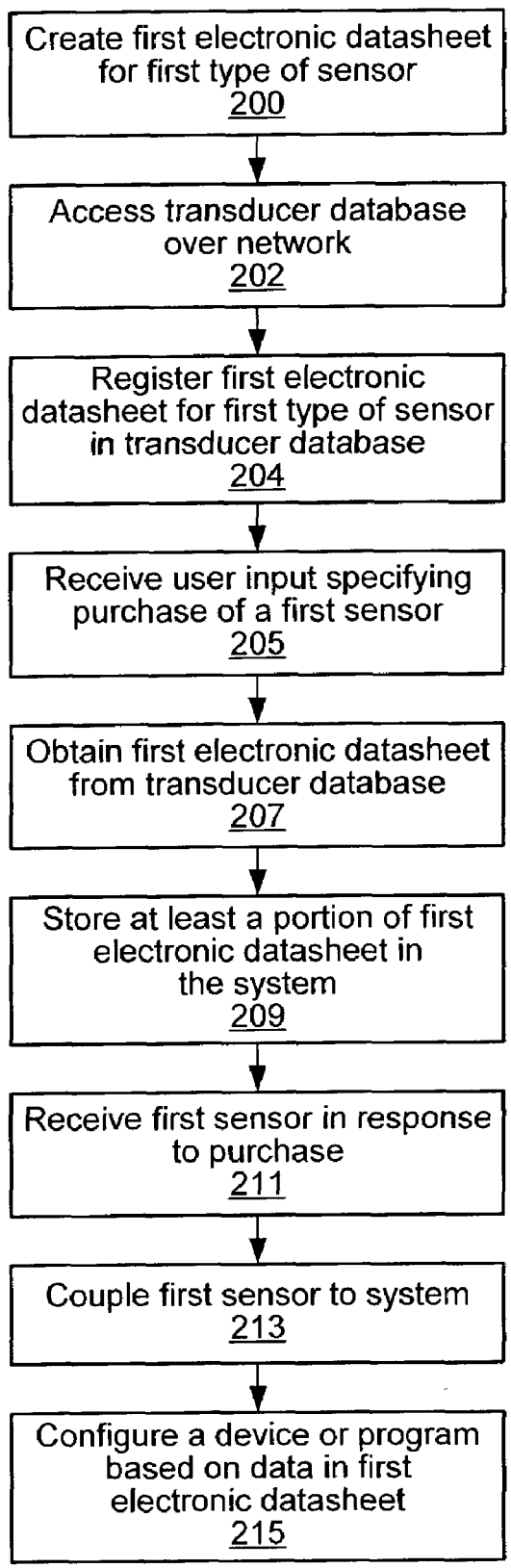
FIG. 6B is a flowchart of a method for operating a transducer database, according to another embodiment.

FIG. 6B—Flowchart for Operating a Transducer Database

FIG. 6B illustrates a flowchart of the method for operating a transducer database, according to one embodiment. In one embodiment, steps 200, 202, and 204 of FIG. 6B may be analogous to steps 200, 202, and 204 of the method described above with reference to FIG. 6A.

In step 205, the user may specify a purchase of a first sensor 110 for a system 104, herein also referred to as a second computer system 104. The system 104 may be coupled to the network 106. The first sensor 110 may be of the first type of sensor. The user may specify purchase of the first sensor using any standard method, such as using the E-commerce system, using a telephone, or any other method known in the art.

In step 207, system 104 may obtain the first electronic datasheet from the transducer database 100 for the first sensor 110, wherein obtaining includes accessing the transducer database 100 over the network 106.

In step 209, at least a portion of the first electronic datasheet may be stored in the system 104. In one embodiment, at least the portion of the first electronic datasheet may be stored in system's 104 RAM, hard drive, and/or any other storage medium.

In step 211, the user may receive the first sensor 110 in response to the purchase. In other words, the first sensor 110 may be delivered to the user using any single or a combination of shipping methods, such as mail, UPS, hand delivery, or any other type of delivery suitable for the purpose.

In step 213, the first sensor 110 may be coupled to the system 104. The first sensor may be coupled to the system 104 using a digital interface, an analog interface, or a mixed-mode interface, as described above with reference to FIGS. 1-2.

In step 215, the device and/or a software program may be configured based on data in the first electronic datasheet. A plug-and-play device and/or the software program may automatically configure itself based on data in the first electronic datasheet (TEDS). For legacy sensors, the user may need to configure the software program, which may be done using a graphical user interface, as described below with reference to FIGS. 10-17.

It is noted that the flowchart of FIG. 6B is exemplary only. Further, various steps in the flowchart of FIG. 6B may occur concurrently or in different order than that shown, or may not be performed, as desired. Also, various additional steps may be performed as desired.

Figure 7:
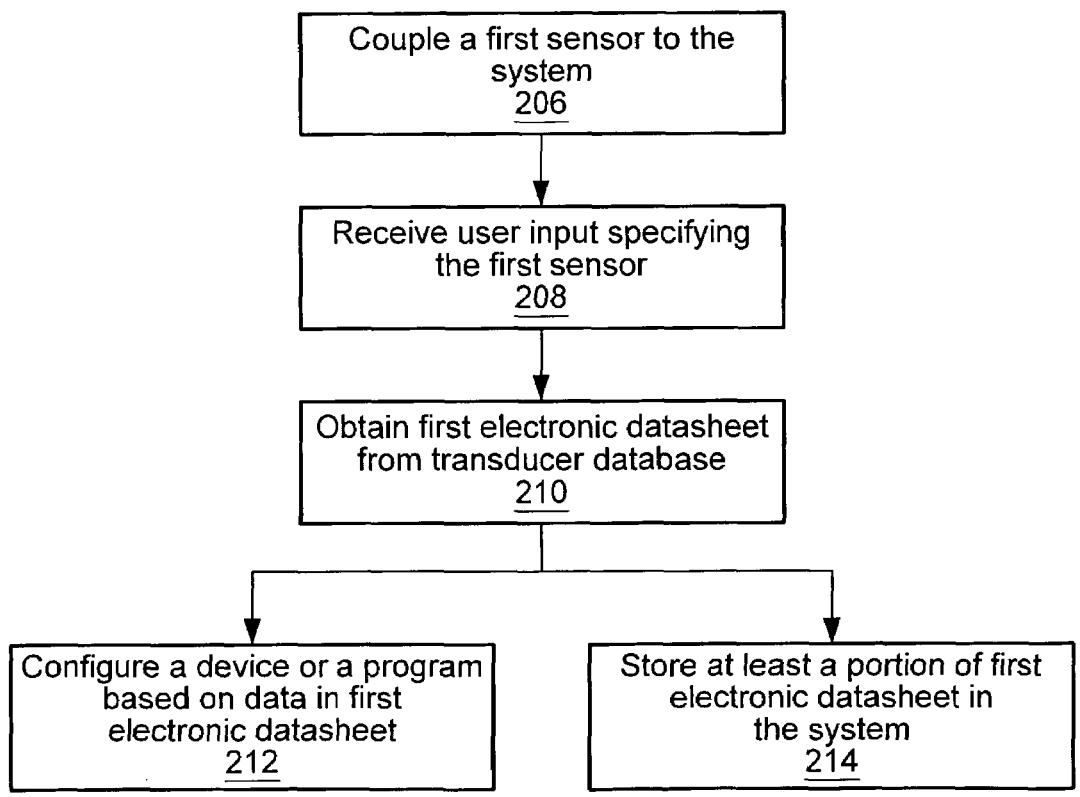
FIG. 7 is a flowchart of a method for using a transducer database to couple a sensor to a system, according to one embodiment.

FIG. 7—Flowchart for Accessing the Electronic Datasheet from the Transducer Database when Using a Sensor FIG. 7 illustrates a flowchart of a computer-implemented method for accessing the electronic transducer datasheet from the transducer database when using a sensor, according to one embodiment.

In step 206, a first sensor 110 may be coupled to a system 104, also referred to as a second computer 104. The system 104 may be coupled to the network 106. The first sensor 110 may be of the first sensor type. The first sensor may be coupled to the system 104 using a digital interface, an analog interface, or a mixed-mode interface, as described above with reference to FIGS. 1-2.

In step 208, the user may specify the first sensor 110. The user may use the system 104 to specify the first sensor, such as an SN 110A4 ACME model thermocouple. In one embodiment, the first sensor may be an analog interface-only sensor type. Therefore prior to user specifying the first sensor, the system 104 may not be operable to correctly interface to the first sensor.

In step 210, the system may obtain the first electronic datasheet from the transducer database 100 for the first sensor 110 by accessing the transducer database 100 over the network 106. The network access may include client-server communication, email, ftp, and/or a web browser. The first electronic datasheet may also be transmitted using a fax, phone, or regular mail prior to registering.

At least one of steps 212 and 214 may be performed after step 210. In step 212, at least one of a device or a software program may be configured based on data in the first electronic datasheet. The device may include a data acquisition board that couples to the first sensor, such as described above with reference to FIGS. 2a, 2B, and 4.

In step 214, at least a portion of the first electronic datasheet may be stored in the system 104. In one embodiment, at least the portion of the first electronic datasheet may be stored in system's 104 RAM, hard drive, and/or any other storage medium.

It is noted that the flowchart of FIG. 7 is exemplary only. Further, various steps in the flowchart of FIG. 7 may occur concurrently or in different order than that shown, or may not be performed, as desired. Also, various additional steps may be performed as desired.

Figure 8:
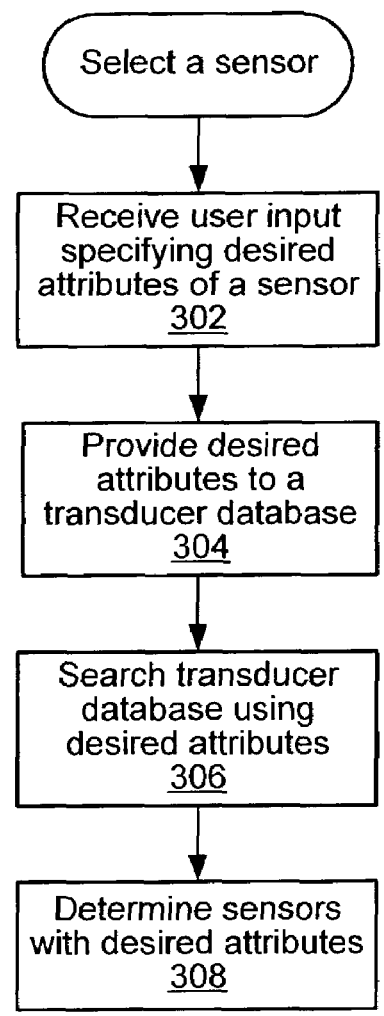
FIG. 8 is a flowchart of a method for selecting a sensor for a measurement system, according to one embodiment.

FIG. 8—Flowchart for Selecting a Sensor for a Measurement System

FIG. 8 is a flowchart illustrating a method for selecting a sensor for a measurement system, according to one embodiment.

In step 302, the user may specify desired attributes of a sensor. For example, the user is in a process of selecting components for a measurement system and desires to find one or more sensors with certain attributes. The system may use a graphical user interface system (GUI) that may be a stand-alone software application, a part of a browser, and/or an E-commerce application. The desired attributes may be input to a system (such as the GUT system), and include one or more of the following, besides others:

type of measurement, such as temperature, voltage, current, strain, acceleration, besides others;
number of bits;
manufacturer;
range for each measurement; and/or
speed requirements for each measurement.

In step 304, the desired attributes may be provided to the transducer database 100. The desired attributes may be provided to the transducer database over a network using a web browser, the E-commerce application, and/or any other type of networking communication known in the art.

In step 306, the transducer database 100 may be searched using the desired attributes. Software executing on the transducer database server 100, or on the computer system 104, may search the transducer database using the desired attributes.

In step 308, one or more sensors may be determined that exhibit the desired attributes, such as being able to take the desired type of measurement, have the desired measurement range and sampling speed, and/or being made by a specific manufacturer.

In one embodiment, one or more icons corresponding to each of the determined one or more sensors may be displayed on a graphical user interface (GUI). Using the GUI, a user may select a first icon out of the one or more icons corresponding to each of the determined one or more sensors in order to purchase a first sensor of the determined one or more sensors. In addition, using the GUI, the user may drag and drop the one or more icons into a configuration diagram on the screen in order to build a measurement system, as described below with reference to FIGS. 10-17.

In one embodiment, after the user indicates a desire to purchase a first sensor of the determined one or more sensors, this information may be provided to a manufacturer. The user may be then be redirected to the manufacturer's E-commerce web site, where the user can purchase the first sensor. The manufacturer's web site may utilize an e-commerce graphical user interface usable to purchase the one or more sensors. In addition, the e-commerce graphical user interface can be used to receive payment information from the user in order to finalize the purchase. The manufacturer may then provide the first sensor to the user. The user may install the first sensor, such as described above with reference to FIG. 7.

In another embodiment, after the user indicates a desire to purchase a first sensor of the determined one or more sensors, this information may be provided to a reseller. The user may be then be redirected to the reseller's E-commerce web site, where the user can purchase the first sensor. The reseller's web site may utilize an e-commerce graphical user interface usable to purchase the one or more sensors. In addition, the e-commerce graphical user interface can be used to receive payment information from the user in order to finalize the purchase. The reseller may then provide the first sensor to the user. The user may install the first sensor, such as described above with reference to FIG. 7.

In one embodiment, the first sensor may be operable to self-calibrate itself. The self-calibration may use the transducer database to obtain corresponding calibration constants and/or algorithms. The transducer database 100 may remind the user to calibrate the first sensor 110 during at least one of a certain time interval or a pre-defined date. For example, the transducer database 100 may remind the user to calibrate the first sensor 110 every six months, or after 100 hours of use. In one embodiment, the transducer database 100 may be searched for calibration information corresponding to the first sensor 110 to determine if the first sensor 110 has a fault.

In one embodiment, the transducer database 100 may automatically update the first electronic datasheet corresponding to the first sensor 110. The automatic update will usually be done over a network 106, and may include updates and/or corrections to the first electronic datasheet.

It is noted that the flowchart of FIG. 8 is exemplary only. Further, various steps in the flowchart of FIG. 8 may occur concurrently or in different order than that shown, or may not be performed, as desired. Also, various additional steps may be performed as desired.

Figure 9:
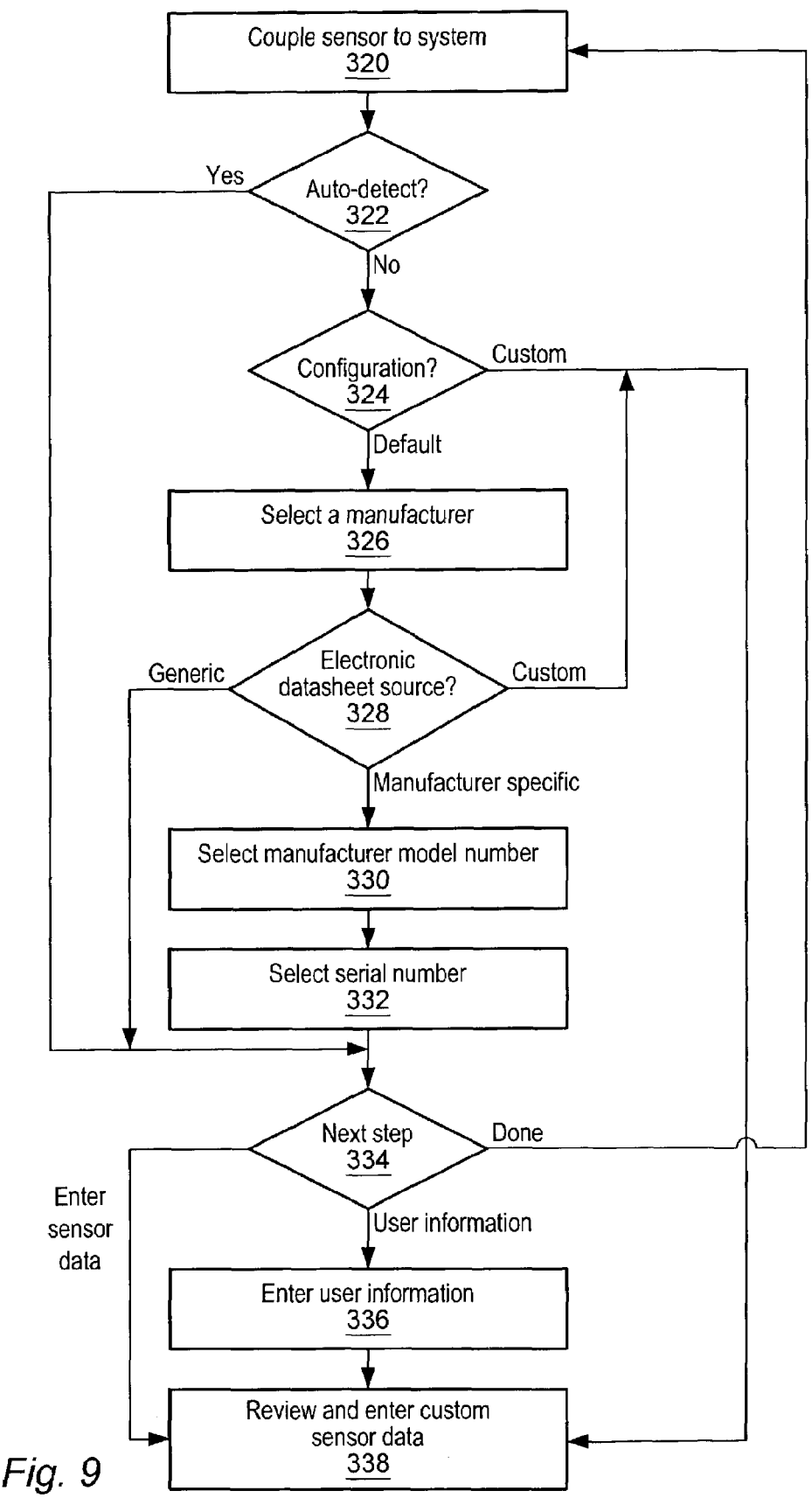
FIG. 9 is a flowchart of a method for selecting a sensor for a measurement system, according to another embodiment.

FIG. 9—Flowchart for Selecting a Sensor for a Measurement System

FIG. 9 is a flowchart illustrating a method for selecting a sensor for a measurement system, according to another embodiment.

In step 320, the sensor may be coupled to a system. The sensor may include any type of an analog sensor, such as a thermocouple, RTD, accelerometer, or strain gauge, besides others.

In step 322, the system may auto-detect the sensor. If the sensor is auto-detected by the system, the method may skip most of the remaining steps and execute step 334 next. If the sensor is not auto-detected, then the method may determine the type of configuration (step 324) for the undetected sensor. For a custom configuration selection, the method may execute step 338 next. The sensor may not have a digital interface connection, i.e., the sensor may only have an analog interface connection. Typically digital sensors with embedded electronic datasheets (TEDS) are auto-detected, and legacy analog sensors without embedded electronic datasheets (TEDS) are not auto-detected.

Figure 14:
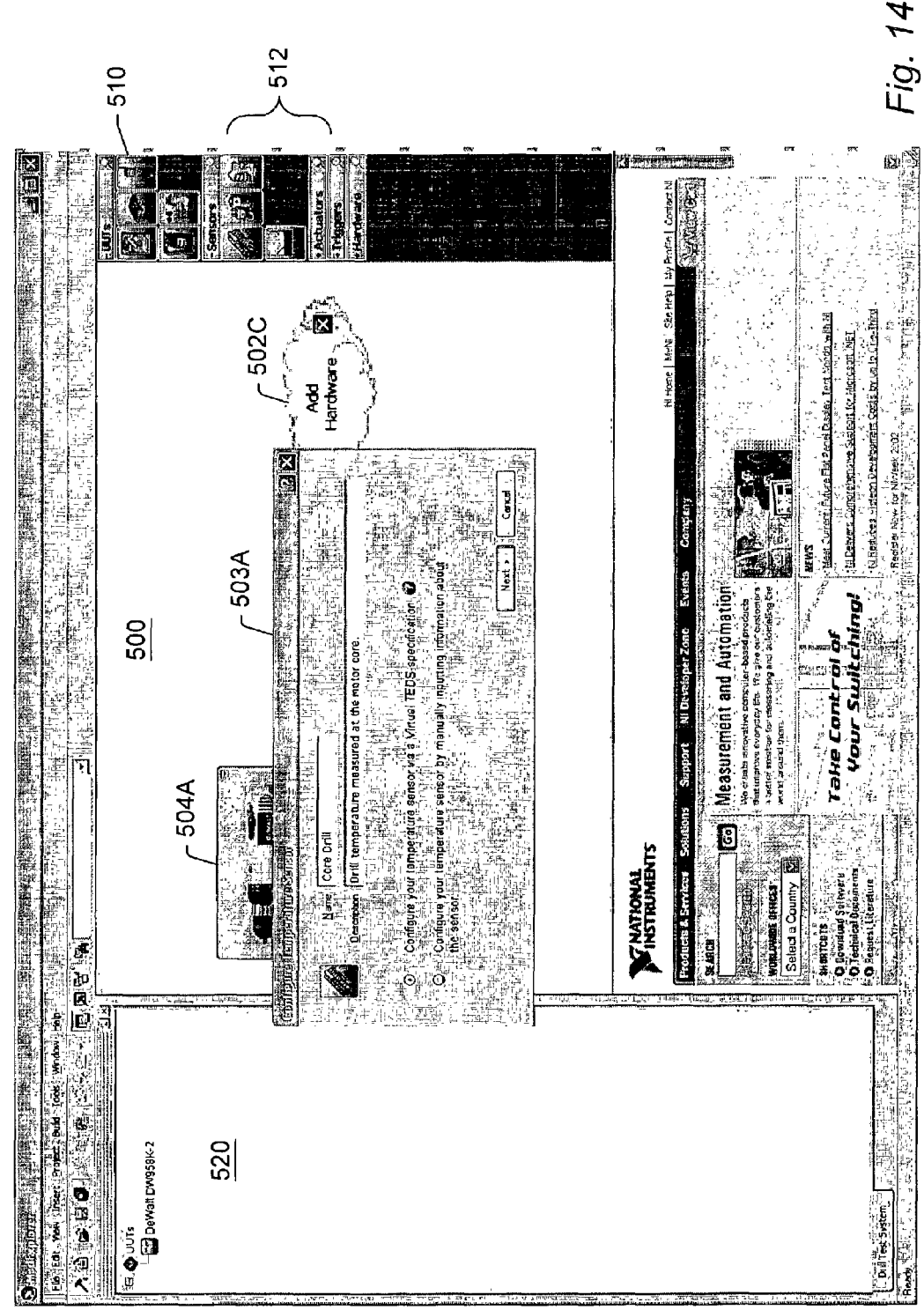

In step 326, the sensor manufacturer may be selected and/or entered, typically using a GUI, such as described below with reference to FIGS. 14-16. The selection and/or entry of the sensor manufacturer may include graphical and/or textual input.

In step 328, the user may choose a source of the electronic datasheet for the sensor, according to one embodiment. A selection of a manufacturer specific source of the electronic datasheet may execute step 330 next. A selection of a generic source of the electronic datasheet may execute step 334 next. A selection of a custom source of the electronic datasheet may execute step 338 next.

In step 330, the user may use the GUI to select and/or enter the sensor model number, as described below with reference to FIGS. 15 and 16. For example, the user may select a first model number out of a list of a plurality of model numbers made by the manufacturer selected in step 326, or the user may type in the model number.

In step 332, the user may select and/or enter a sensor serial number, as described below with reference to FIGS. 15 and 16. For example, the user may select a first sensor serial number for a plurality of sensor serial numbers of the first model number selected in step 330, or the user may type in the sensor serial number.

In step 334, the user may select and/or enter user information (step 336) and/or enter custom sensor data (step 338). The custom sensor data may include any items specific to the type of the sensor and/or measurement system specific configuration and/or data.

In addition, in step 338, the user may review the configuration choices besides entering custom sensor data.

It is noted that the flowchart of FIG. 9 is exemplary only. Further, various steps in the flowchart of FIG. 9 may occur concurrently or in different order than that shown, or may not be performed, as desired. Also, various additional steps may be performed as desired.

FIGS. 10-17—Exemplary Screenshots of a System for Selecting Sensors

FIGS. 10-17 illustrate exemplary screenshots of one embodiment of a system for selecting sensors, such as described above with reference to FIGS. 8 and 9. In one embodiment, configuration software may be downloaded, installed, and executed on the second computer 104. In one embodiment, configuration software may execute inside an Internet browser, such as Microsoft Explorer or Netscape Navigator, among others. In other embodiments, the configuration software can execute on a server, and/or as a part of the Internet browser.

In one embodiment, when the configuration software is started, a software wizard may provide a user with options, including:

1) guided use of the software wizard system; and/or
2) manual use of the configuration software.

In one embodiment, the software wizard may use Graphical User Interface (GUI) elements, such as tables and drop down menus, to prompt for measurement attributes, including a temperature range, voltage rate, and/or sampling requirements, besides others. As a result, the software wizard might display sensors that exhibit the measurement attributes. In one embodiment, the configuration software may divide a display 450 of a computer into a plurality of parts, including a diagram portion 500, a menu palette 510, and a tree view 520, besides others.

In one embodiment, the configuration software may display empty icons 502A, 502B, and 502C on the display 450 of the computer. The empty icons 502A, 502B, and 502C may indicate undefined requirements, and thus may require action to be performed. The empty icons 502A, 502B, and 502C can be dismissed by the user, or the empty icons 502A, 502B, and 502C can be selected in order to start a software wizard or a guidance mechanism.

Figure 10:
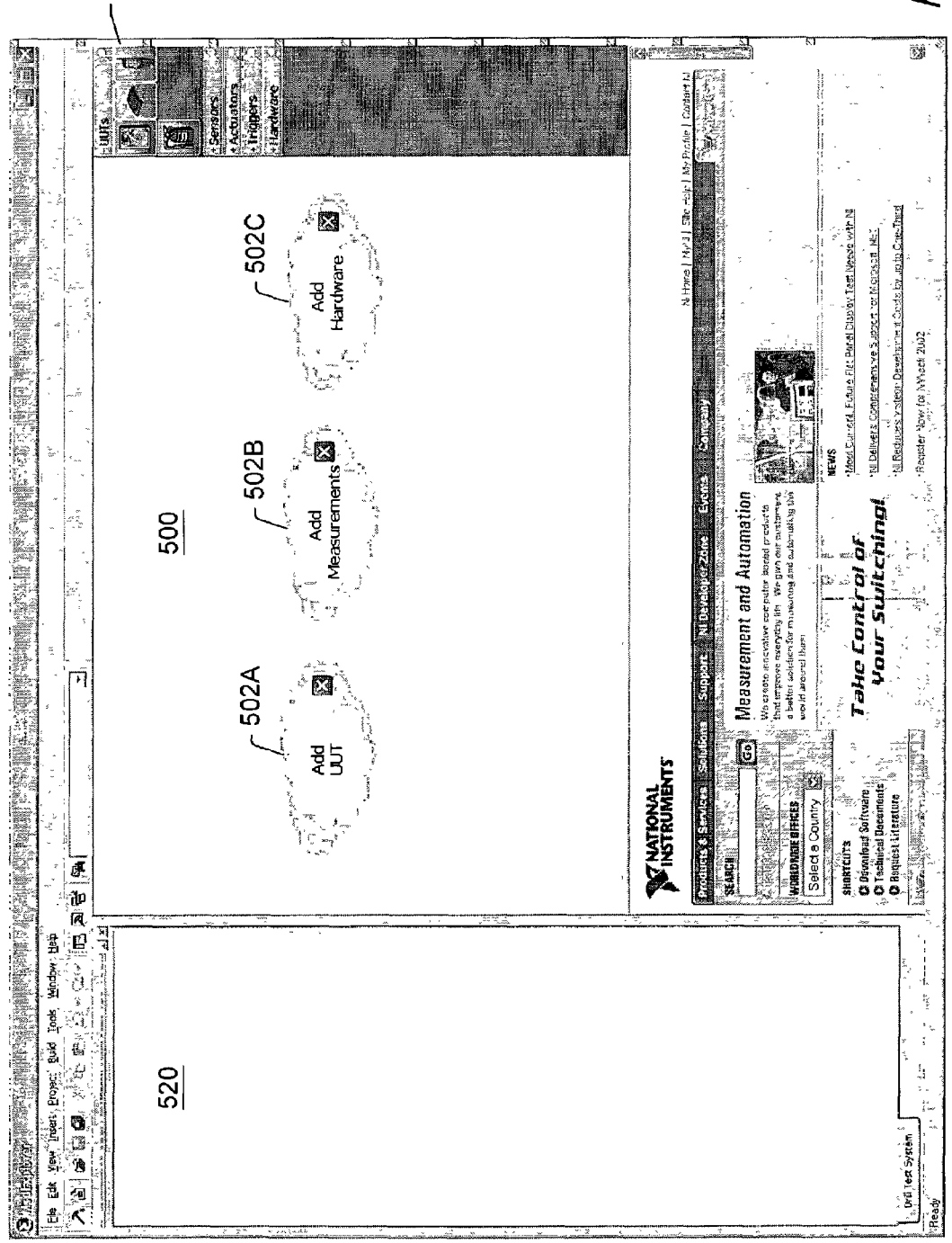
FIGS. 10-17 are exemplary screenshots of a system for selecting sensors, according to one embodiment.

For example, in one embodiment, FIG. 10 illustrates three empty icons 502A, 502B, and 502C. In one embodiment, the first empty icon 502A may be labeled "Add UUT", the second empty icon 502B may be labeled "Add Measurements", and the third empty icon 502C may be labeled "Add Hardware".

In one embodiment, various templates of empty icon configurations may exist. FIGS. 10-17 illustrate an exemplary empty icon configuration, with "Add UUT", "Add Measurements" and "Add Hardware" empty icons displayed. One example of another template may include a motion control template, which could include "Add Stage", "Add Connector", and/or "Add Relay" empty icons, besides others.

In one embodiment, a "UUT", "Measurement", or "Hardware" icon can be selected from the menu palette 510, and dragged and dropped onto any empty icon on the diagram 500, such as the icon 502, 502B, and/or 502C. The dragging may result in a dismissal of the empty icon.

Figure 11:
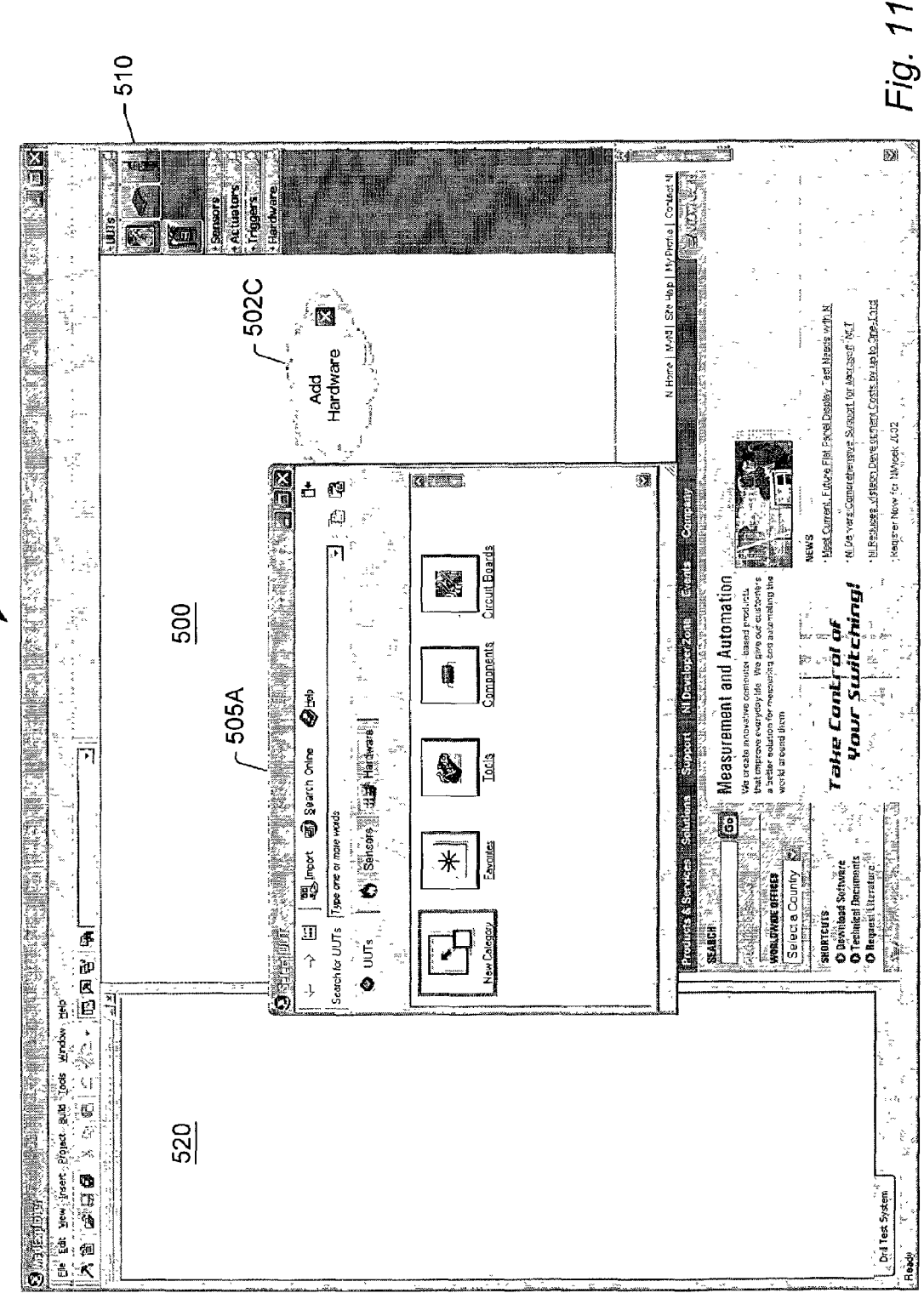
Figure 12:
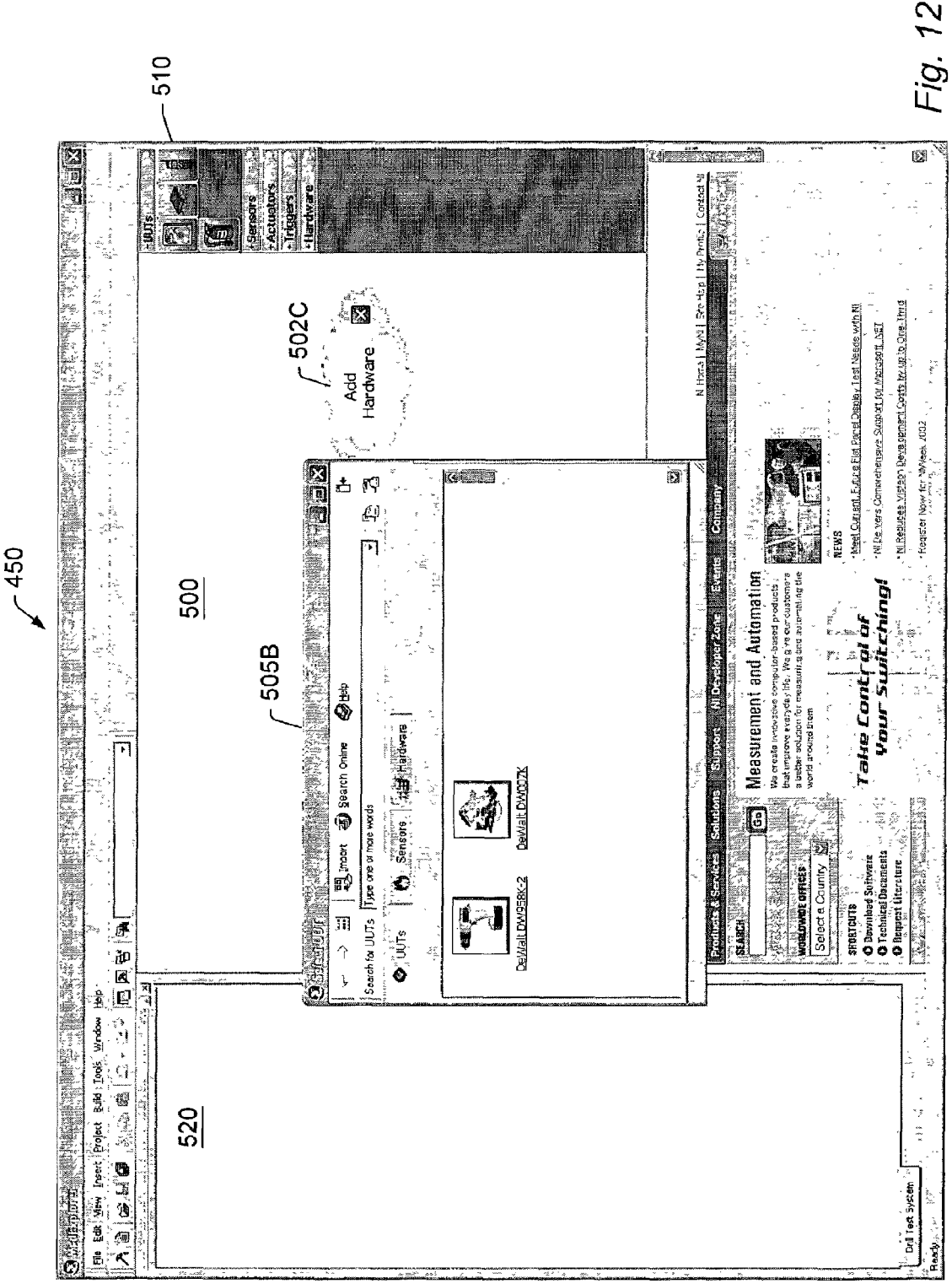

In one embodiment, if the user selects the "Add UUT" empty icon 502A, a pop-up window may provide different types of Units Under Test (UUTs), such as illustrated by windows 505A and 505B in FIGS. 11 and 12 respectively. For example, a local UUT can be selected, where the local UUT contains configuration information on a local hard drive. An online database can be used to select a UUT that is not available locally.

Figure 13:
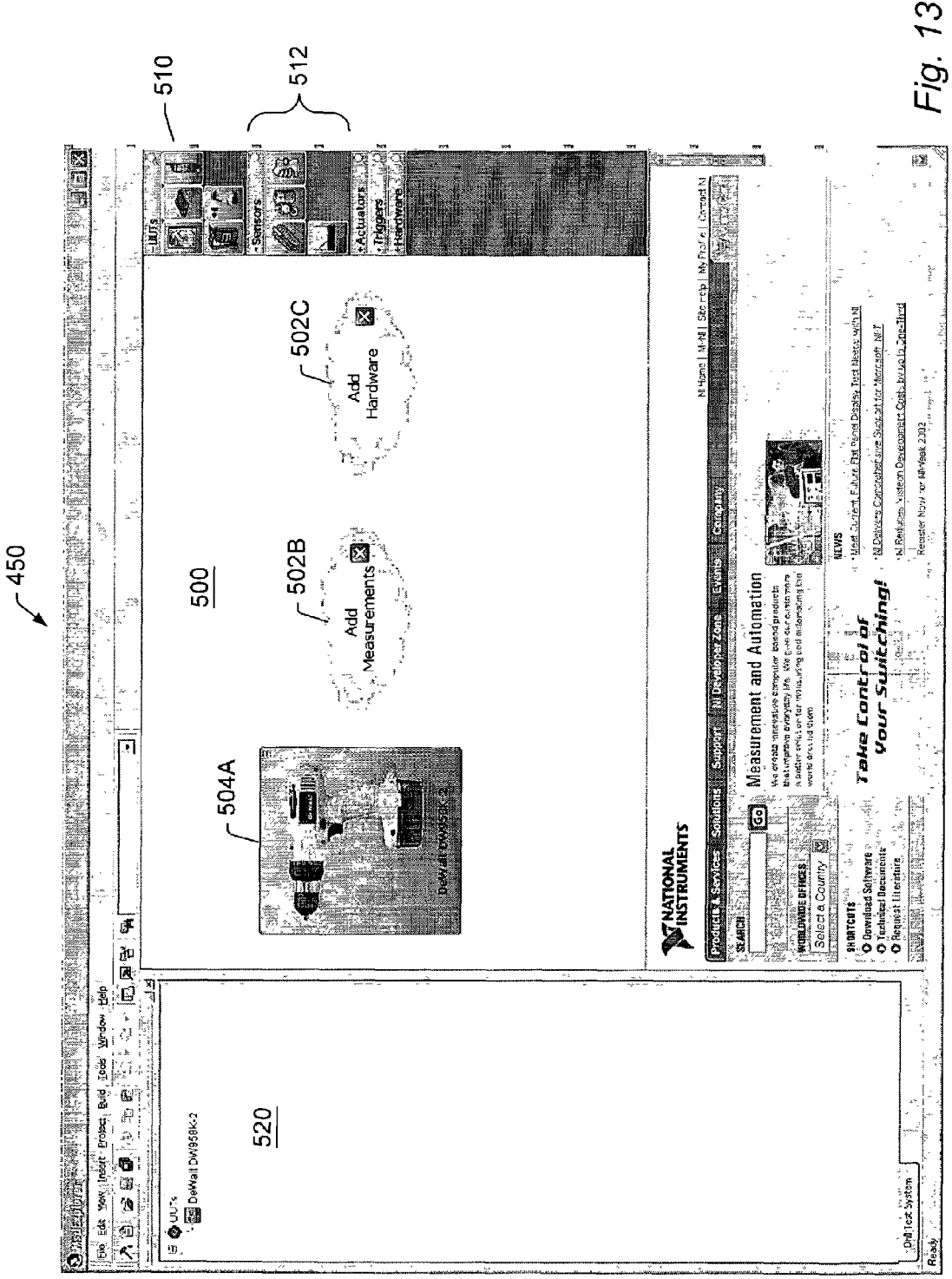

For example, FIGS. 11 and 12 illustrate a selection of the "Add UUT" empty icon 502A. As the "Add UUT" empty icon 502A is selected, a graphical image of the UUT 504A may appear in the diagram 500, as illustrated in FIG. 13. In addition to being available in the diagram 500, the UUT may be positioned in a tree view 520.

FIG. 13 also illustrates an embodiment where the user selects "Sensors" out of the menu palette 510 and 512. FIG. 14 illustrates an example where the user can select or enter a name for a measurement, as well as select or enter a description for the measurement.

In one embodiment, the user may be presented with two options:

1) to use transducer database 100 to obtain the sensor specification information; or 2) to manually input configuration information such as temperature ranges and/or other sensor dependent information.

Figure 15:
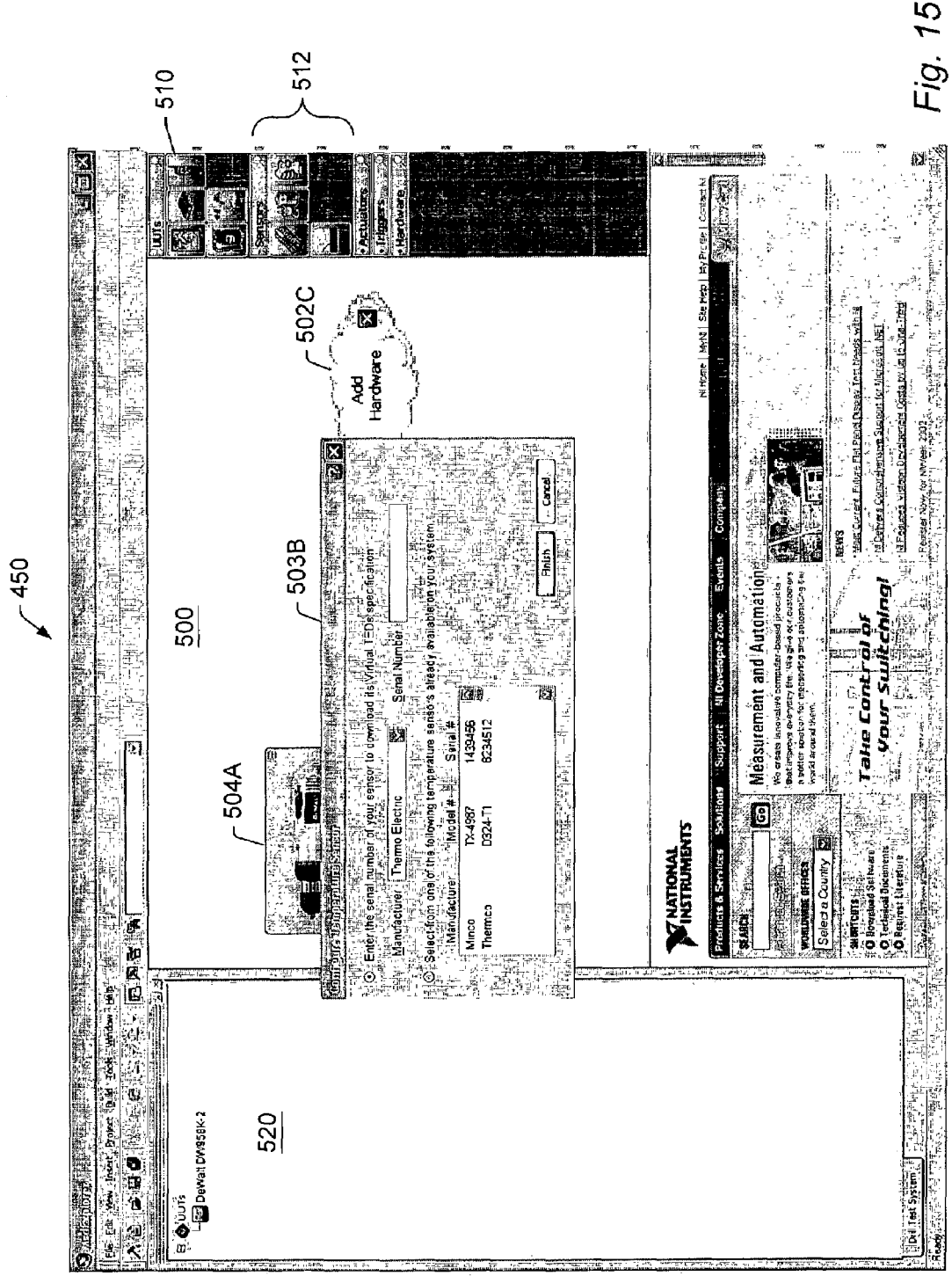
Figure 16:
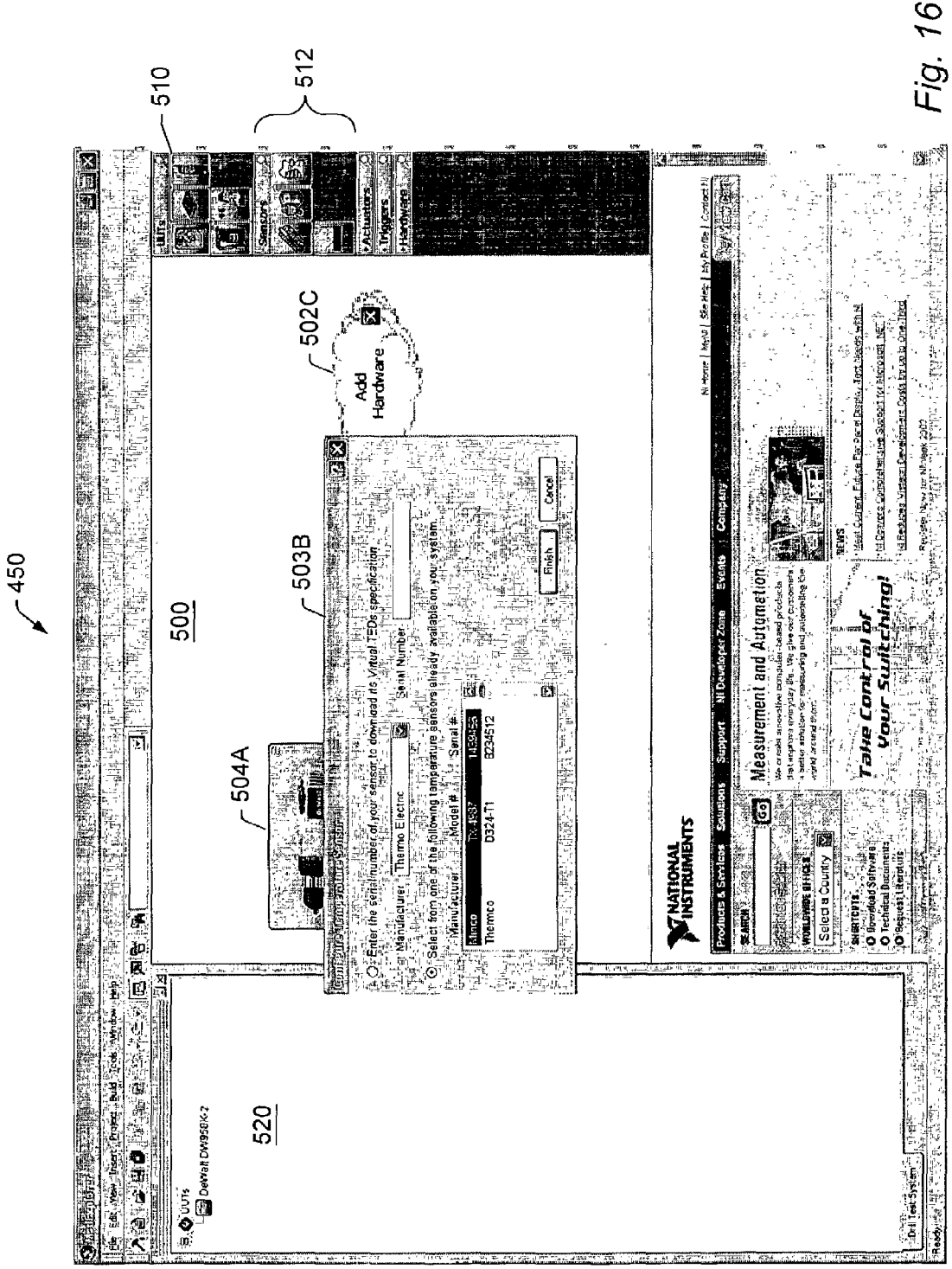

In one embodiment, if the user selects the first option "..Virtual TEDS..", sensors already coupled to the system may be shown, as illustrated in a window 503B in FIGS. 15 and 16. In addition, the user can select sensors from the transducer database 100, or the user can initiate a search of the transducer database 100 using one or more of the following: a transducer manufacturer, and a serial number, besides others. The result of the search may be an electronic datasheet, which may be downloaded to the system.

Figure 17:
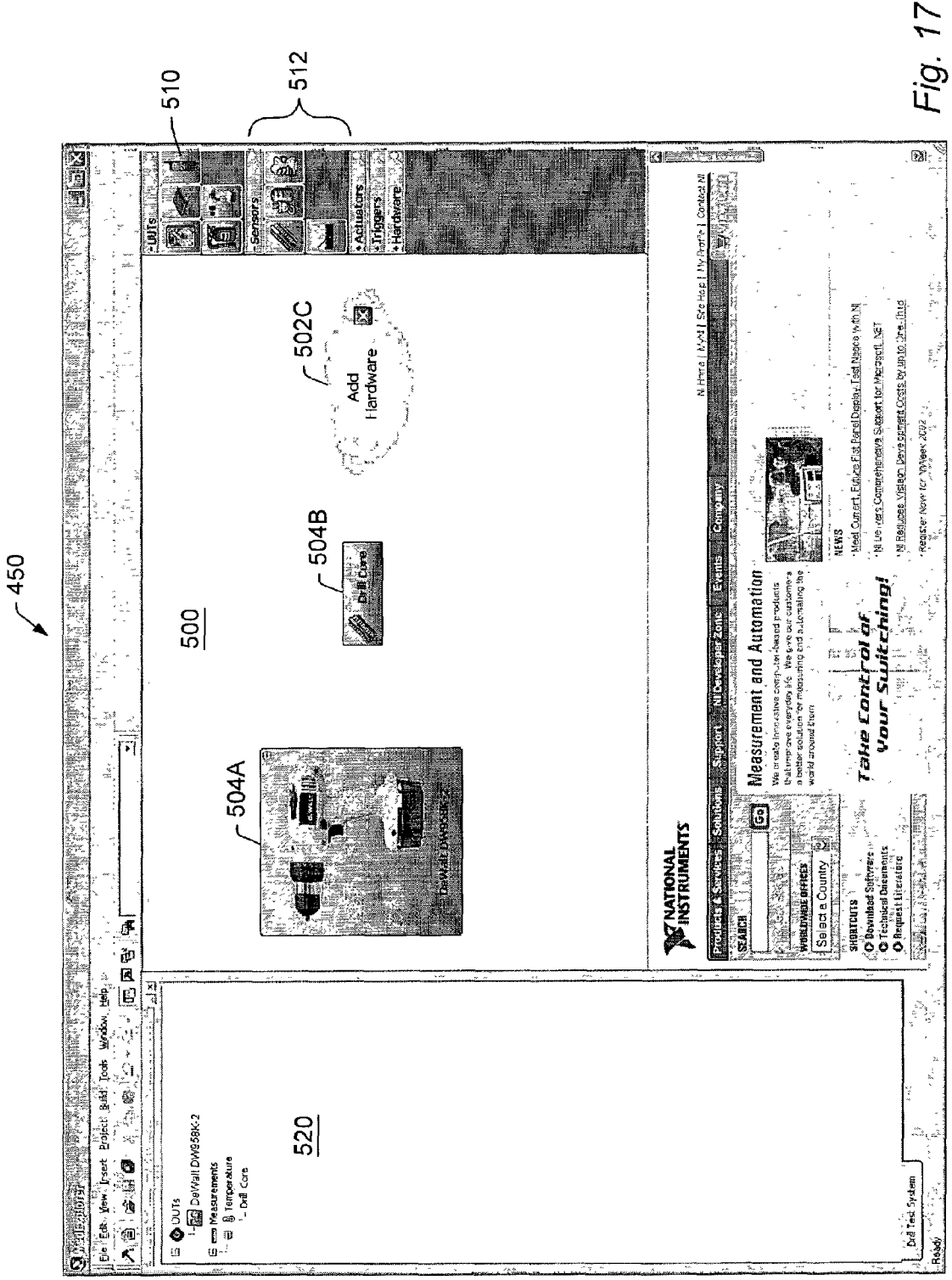

In one embodiment, the sensor may be configured, as illustrated by the "Drill Core" icon 504B in FIG. 17. In one embodiment, the tree view 520 may also display "drill core temperature" icon. The user can add and/or modify other measurements and/or sensors.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A computer-implemented method for operating a transducer database, the method comprising:
    creating a first electronic datasheet for a first type of sensor on a first computer, wherein said creating comprises specifying a plurality of attribute values for the first type of sensor;
    accessing the transducer database over a network, wherein the transducer database is a central database for storing electronic datasheets for a plurality of different types of sensors from different manufacturers; and
    registering the first electronic datasheet for the first type of sensor in the transducer database, wherein said registering comprises storing the first electronic datasheet in the transducer database, wherein the first type of sensor does not contain an electronic datasheet.

2. The method of claim 1,
    wherein said accessing the transducer database over a network comprises using one or more of:
    client-server communication;
    email;
    ftp; and
    a web browser.

3. The method of claim 1,
    wherein said creating, said accessing and said registering are performed for a plurality of different types of sensors.

4. The method of claim 1,
    wherein said creating, said accessing and said registering are performed for a plurality of different manufacturers.

5. The method of claim 1, further comprising:
    coupling a first sensor to a system, wherein the system is coupled to the network, wherein the first sensor is of the first sensor type;
    obtaining the first electronic datasheet from the transducer database for the first sensor, wherein said obtaining includes one or more of:
        accessing the transducer database over the network;
        accessing at least a partial local copy of the transducer database;
    after said obtaining, performing at least one of: 1) configuring at least one of a device or a software program based on data in the first electronic datasheet; and 2) storing at least a portion of the first electronic datasheet in the system.

6. The method of claim 5, further comprising:
    receiving user input specifying the first sensor;
    wherein said obtaining is performed based on the user input.

7. The method of claim 5,
    wherein the first sensor does not include a digital interface connection.

8. The method of claim 1,
    wherein the system includes a computer system, wherein the computer system includes a software program, wherein said obtaining comprises the computer system execute the software program to programmatically obtain the first electronic datasheet.

9. The method of claim 1, further comprising:
    receiving user input specifying purchase of a first sensor for a system, wherein the system is coupled to the network, wherein the first sensor is of the first type of sensor;
    obtaining the first electronic datasheet from the transducer database for the first sensor, wherein said obtaining includes accessing the transducer database over the network; and
    storing at least a portion of the first electronic datasheet in the system.

10. The method of claim 9, further comprising:
    receiving the first sensor in response to the purchase;
    coupling the first sensor to the system; and
    configuring at least one of a device or a software program based on data in the first electronic datasheet.

11. The method of claim 1,
    wherein the transducer database is stored in a server, the method further comprising:
    presenting a graphical user interface on the server, wherein the graphical user interface is useable in guiding the user in selecting and purchase of a sensor.

12. The method of claim 1,
    wherein the first type of sensor is at least one of:
    an analog sensor operable to measure analog phenomena;
    a digital sensor operable to measure digital phenomena.

13. The method of claim 1, further comprising:
    creating a datasheet for a sensor model, wherein the first electronic datasheet is an instance of the datasheet for the sensor model.

14. The method of claim 13,
    wherein the datasheet for a sensor model comprises a plurality of distinct first electronic datasheets, wherein each one of the plurality of distinct first electronic datasheets corresponds to a type of a sensor.

15. The method of claim 1,
    wherein the transducer database comprises one or more of following categories for categorizing electronic datasheets:
    a type;
    a sub-type;
    a model; and
    a specific instance, wherein a specific instance comprises a serial number of a sensor.

16. The method of claim 1,
    wherein said accessing comprises using encrypted access over the network.

17. The method of claim 1,
    wherein said registering further comprises using security features, wherein said using the security features comprises confirming one or more of a user name or a user password, wherein said registering further comprises using encrypted access over the network.

18. The method of claim 1,
wherein the transducer database comprises a distributed database.

19. A method for configuring operation of a sensor in a measurement system, the method comprising:
  coupling a first sensor to a system, wherein the system is coupled to the network, wherein the first sensor is of a first sensor type, wherein the first sensor type does not contain an electronic datasheet;
  obtaining a first electronic datasheet from a transducer database for the first sensor, wherein the first electronic datasheet corresponds to sensors of the first sensor type, wherein said obtaining includes one or more of:
    accessing the transducer database over the network, wherein the transducer database is a central database for storing electronic datasheets for a plurality of different types of sensors from different manufacturers;
    accessing at least a partial local copy of the transducer database;
  after said obtaining, performing at least one of: 1) configuring at least one of a device or a software program based on data in the first electronic datasheet; and 2) storing at least a portion of the first electronic datasheet in the system.

20. The method of claim 19, further comprising:
receiving user input specifying the first sensor;
wherein said obtaining is performed based on the user input.

21. A system, the system comprising:
a network;
a transducer database, wherein the transducer database is coupled to the network;
a first computer, wherein the first computer is coupled to the network;
a first type of sensor;
wherein the first computer is operable to:
  create a first electronic datasheet for the first type of sensor, wherein said creating comprises specifying a plurality of attribute values for the first type of sensor, wherein the first type of sensor does not contain an electronic datasheet;
  access the transducer database over the network, wherein the transducer database is a central database for storing electronic datasheets for a plurality of different types of sensors from different manufacturers; and
  register the first electronic datasheet of the first type of sensor in the transducer database, wherein said registering comprises storing the first electronic datasheet in the transducer database.

22. The system of claim 21,
wherein the first type of sensor is coupled to the first computer.

23. The system of claim 21, further comprising:
a computer system, wherein the computer system is coupled to the network;
a first sensor, wherein the first sensor is coupled to the computer system, wherein the first sensor is of the first sensor type;
wherein the computer system is operable to:
  obtain the first electronic datasheet from the transducer database for the first sensor, wherein said obtaining includes one or more of:
    accessing the transducer database over the network;
    accessing at least a partial local copy of the transducer database;
  after said obtaining, perform at least one of: 1) configure at least one of a device or a software program based on data in the first electronic datasheet; and 2) store at least a portion of the first electronic datasheet in the computer system.

24. The method of claim 23,
wherein the first sensor does not include a digital interface connection.

25. The method of claim 21,
wherein the first type of sensor is an analog sensor operable to measure analog phenomena.

* * * * *